(12) United States Patent
Stone

(10) Patent No.: US 10,041,634 B2
(45) Date of Patent: Aug. 7, 2018

(54) METHOD AND APPARATUS FOR COLLIMATING LIGHT FROM A LASER-EXCITED PHOSPHOR ELEMENT

(71) Applicant: Kevin Stone, Chandler, AZ (US)

(72) Inventor: Kevin Stone, Chandler, AZ (US)

( * ) Notice: Subject to any disclaimer, the term of this patent is extended or adjusted under 35 U.S.C. 154(b) by 0 days.

(21) Appl. No.: 15/368,492

(22) Filed: Dec. 2, 2016

(65) Prior Publication Data

US 2017/0146202 A1 May 25, 2017

Related U.S. Application Data

(63) Continuation-in-part of application No. 14/828,137, filed on Aug. 17, 2015.

(51) Int. Cl.
| | |
|---|---|
| *F21V 3/00* | (2015.01) |
| *F21K 9/64* | (2016.01) |
| *F21V 7/06* | (2006.01) |
| *F21V 7/08* | (2006.01) |
| *F21V 8/00* | (2006.01) |
| *G02B 27/10* | (2006.01) |
| *G02B 6/42* | (2006.01) |
| *F21K 9/61* | (2016.01) |
| *F21Y 113/10* | (2016.01) |

(52) U.S. Cl.
CPC .............. *F21K 9/64* (2016.08); *F21K 9/61* (2016.08); *F21V 7/06* (2013.01); *F21V 7/08* (2013.01); *G02B 6/0006* (2013.01); *G02B 6/0008* (2013.01); *G02B 6/42* (2013.01); *G02B 27/1006* (2013.01); *F21Y 2113/10* (2016.08)

(58) Field of Classification Search
CPC ... F21V 7/00; F21V 13/14; F21V 7/06; F21V 2200/13; F21V 7/08; G02B 6/0005; G02B 6/0008; G02B 6/0003; G02B 6/0026; G02B 6/0055; G02B 2207/113
USPC ........................................................ 362/583
See application file for complete search history.

(56) References Cited

U.S. PATENT DOCUMENTS

| | | | |
|---|---|---|---|
| 7,530,710 B2* | 5/2009 | Berben | F21S 10/02 362/231 |
| 2011/0157865 A1* | 6/2011 | Takahashi | F21S 48/115 362/84 |
| 2013/0208496 A1* | 8/2013 | Kishimoto | F21V 9/16 362/553 |

* cited by examiner

*Primary Examiner* — William Carter

(57) ABSTRACT

A lighting apparatus and method of steering light from a laser-excited phosphor element. In one embodiment, the lighting apparatus includes: (1) a laser module configured to generate coherent light, (2) a concave mirror and (3) a phosphor capsule located proximate a focus of the concave mirror and configured to receive and phosphoresce in response to the coherent light and project resulting light upon the concave mirror, the concave mirror configured to steer the resulting light in a direction.

26 Claims, 3 Drawing Sheets

METHOD AND APPARATUS FOR COLLIMATING LIGHT FROM A LASER-EXCITED PHOSPHOR ELEMENT

CROSS-REFERENCE TO RELATED APPLICATION

This application is a continuation-in-part of U.S. patent application Ser. No. 14/828,137 filed by Stone on Aug. 17, 2015, entitled "Method and Apparatus for Collimating Light from a Laser-Excited Phosphor Element," which, in turn, claimed the benefit of U.S. Provisional Application Ser. No. 62/038,526, filed by Stone on Aug. 18, 2014, entitled "Method and Apparatus for Collimating Light from a Laser-Excited Phosphor Element." Both prior applications are commonly owned with this application and incorporated herein by reference.

TECHNICAL FIELD

This application is directed, in general, to lighting sources and, more specifically, to lighting sources employing laser-excited phosphor elements.

BACKGROUND

Increasing demand for more efficient lighting sources has led many industries away from incandescent, arc and induction light sources and into solid state lighting. Solid state lighting has primarily been represented by light emitting diodes due to their long duty cycles and high rate of conversion of electrical energy into light (at about 80% efficiency). Light-emitting diode (LED) light sources are not, however, without their drawbacks. First, LEDs are narrow-band emitters, typically covering a band of some 10 nm at half height of the output curve. This makes emission of full spectrum white light from an LED-only illuminator highly impractical, as doing so would require tens of different-wavelength emitters. Consequently, lighting manufacturers have used combinations of LEDs and phosphors that are excited by the center wavelength of a given color LED to approximate white light. This approach also has its drawbacks, in that the spectral output profile is characterized by a spike at the center of the LED's emission band surrounded by a roughly 10 nm half-height curve, then a broad but lower amplitude band (as compared with the LED output) from the secondary phosphor emission, typically representing one-quarter to one-third of the visible spectrum, which then trails off to near zero emission at the lower visible frequencies, resulting in an approximate "white light" output that is deficient in the green and red bands. So-called "warm white" LED/phosphor chips shift the phosphor output lower in the frequency band, but still exhibit broad gaps of little or no emission in at least two spectral bands.

LEDs also present significant issues in controllability of output light due to the planar configuration of the emitter. Etendue imposes strict requirements upon the size of a collimator necessary to attain a given collimation angle for the collected beam from the emitter. With current available LED output coupled with practical luminaire size constraints, beam collimation is typically limited to no tighter than 8° without significant loss of optical efficiency. This makes LEDs relatively inefficient sources for imaging optical systems and especially for collimating systems such as searchlights and spots.

The solid state alternatives to LEDs are lasers. In the past, LEDs have held a significant cost and efficiency advantage over lasers for general illumination applications. While LEDs typically convert approximately 80% of electrical energy consumed into light, older lasers typically converted electricity at a rate of only about 20%. Lasers were also difficult to cool and also exhibit narrow band emission patterns similar to those of LEDs.

Advances in laser technology have resulted in lasers capable of conversion of electrical energy to light at closer to 60%, comparing favorably with the 80% conversion rate for LEDs. It has also resulted in dramatically less expensive laser modules with significantly reduced cooling requirements similar to those for LEDs and have service lives that compare favorably with high-output LEDs. And while still more expensive and less electrically efficient than LEDs, laser light has the advantage of being coherent, and not dispersive as is the light produced by planar LED emitters. This allows for vastly better control of output light, resulting in optical efficiencies that may be several times better than those for LEDs in highly collimated beams, overcoming cost and electrical conversion efficiency deficiencies relative to LEDs.

In addition to the coherent nature of coherent light sources making higher degrees of collimation of output light possible, it also lends itself to combination of multiple emitters of differing chromaticity into a single beam via readily available optical combiners. While LEDs may also be combined via combiners such as dichroic "x-cubes," efficiency is compromised by the limited ability to collimate the output from the individual emitters. This results in significant portions of the beams from these emitters striking dichroic elements off-axis, thereby limiting the efficiency of the reflectivity of the dichroic elements and resulting in light loss. The coherent light produced by lasers does not suffer this light loss.

The value of combination of heterogeneous emitters into a single beam is the capability better to approximate full-spectrum light. This is especially true if multiple phosphors excited at different wavelengths and emitting in different visible light bands may be incorporated into the system. Innumerable lighting applications require a high degree of collimation from light sources. These include searchlights, theatrical fixtures, spotlights and cinema lighting. Likewise, innumerable lighting applications require full-spectrum white light (or at least a reasonable approximation thereof). These applications include lighting for television, cinema production and theater and art gallery lighting, where accurate representation of illuminated pigments or full representation of the spectrum for excitement of CCDs is necessary.

SUMMARY

One aspect provides a lighting apparatus. In one embodiment, the lighting apparatus includes: (1) a laser module configured to generate coherent light, (2) a concave mirror and (3) a phosphor capsule located proximate a focus of the concave mirror and configured to receive and phosphoresce in response to the coherent light and project resulting light upon the concave mirror, the concave mirror configured to steer the resulting light in a direction.

Another aspect provides a method of steering light from a laser-excited phosphor element. In one embodiment, the method includes: (1) producing coherent light, (2) providing the coherent light to a phosphor capsule located proximate a focus of a concave mirror, (3) causing the phosphor capsule to phosphoresce in response to the coherent light and produce resulting light, the resulting light being projected onto the concave mirror and (4) steering the resulting light in a direction using the concave mirror.

BRIEF DESCRIPTION

Reference is now made to the following descriptions taken in conjunction with the accompanying drawings, in which.

DETAILED DESCRIPTION

Figure 1:
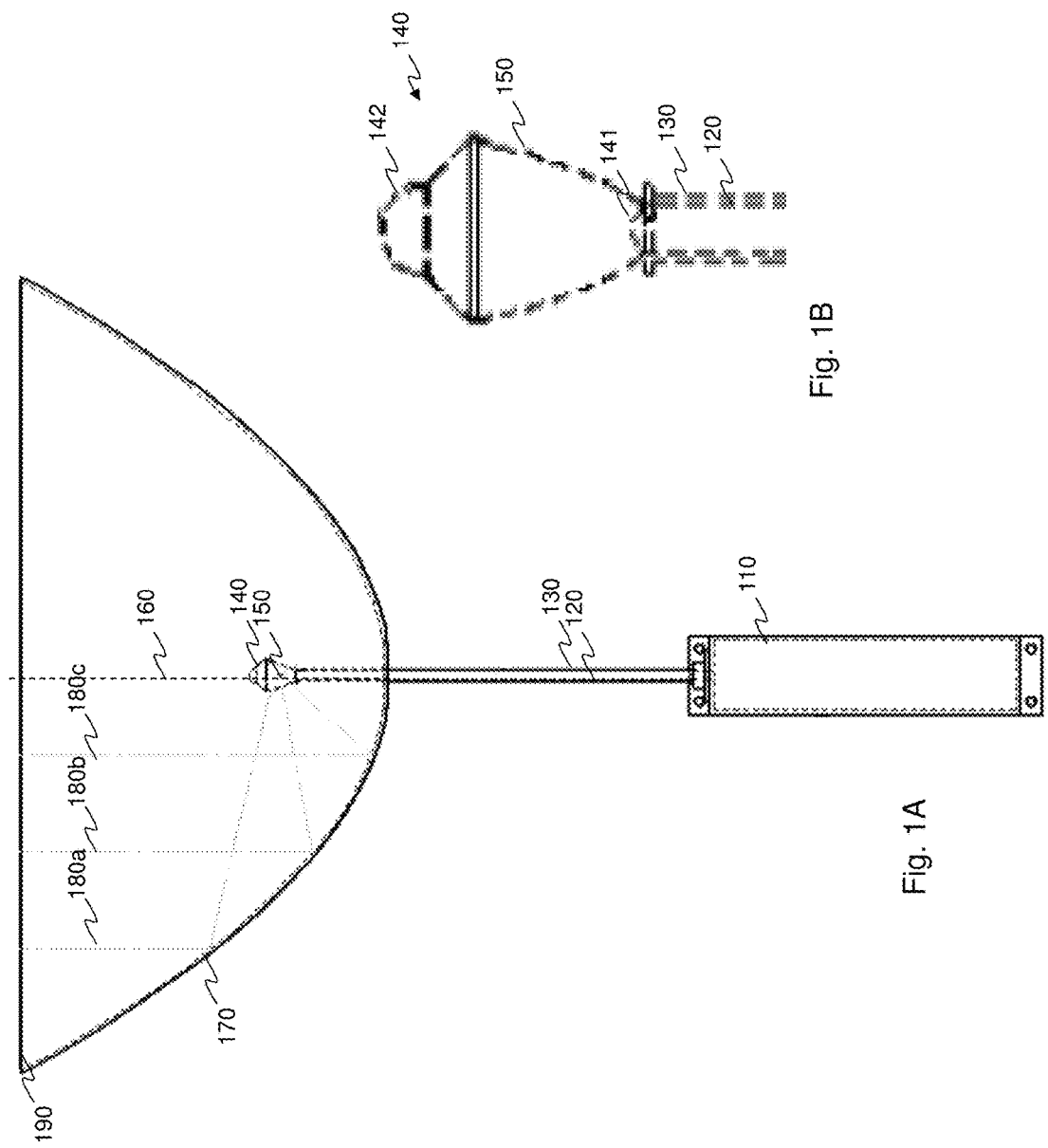
FIG. 1A is a diagram of a first embodiment of an apparatus for steering light from a laser-excited phosphor element.
FIG. 1B is a diagram of a portion of the apparatus of FIG. 1A.

As described above, various attempts have been made to collect and collimate coherent light to make it more useful for lighting application. It is realized herein that the inherent controllability of coherent light could be advantageous in a wide range of lighting applications were it to be more efficiently collected, dispersed and projected in one or more desired directions. It is further realized herein that light emitted by phosphors that are excited by the coherent light could play a far larger role in lighting applications were it to be more efficiently projected. It is still further realized herein that a light source employing multiple laser-phosphor combinations emitting at differing frequencies so as to provide emission of a fuller range of the visible light spectrum would be advantageous in a wide range of lighting applications.

Introduced herein are a method and apparatus for steering light from a laser-excited phosphor element. In general, the apparatus employs one or more laser modules to generate coherent light, which is then projected into and spread by optical elements onto a phosphor element located proximate the center axis of a concave mirror. Excitation by the coherent light causes the phosphor element to phosphoresce, producing resulting light. The resulting light produced by the phosphor element is projected upon the mirror, which steers the resulting light to be dispersed in a general direction. In one embodiment, the mirror is a paraboloid, the phosphor element is located at least proximate the focus of the mirror, and the mirror steers the resulting light toward a particular direction, substantially if not completely collimating it. In another embodiment, the mirror is an ellipsoid, the phosphor element is located at least proximate a focus of the mirror, and the mirror steers the resulting light toward a particular point in space.

In still other embodiments, the resulting light may pass through one or more further optical elements, an exit aperture or both one or more further optical elements and an exit aperture further to shape the resulting light exiting the apparatus.

In yet still other embodiments, one or more fiber optic cables convey the coherent light from the one or more laser modules to the optical elements. In yet another embodiment, the optical elements include either a convex lens or holographic diffuser and a concave reflector, such that the coherent light is dispersed and reflected back to strike the phosphor element.

In still yet other embodiments, the phosphor element includes a surface coated with one or more phosphor coatings. The surface is located proximate the center axis or focus of the mirror (depending upon whether the mirror is concave but nonparaboloid, a paraboloid or an ellipsoid). In other embodiments, the surface takes the form of a cylinder, a frustrocone or a bulb. In related embodiments, the surface is coated on one or both surfaces with one or more phosphor coatings. Various embodiments of the apparatus and method will now be described.

FIG. 1A is a diagram of a first embodiment of an apparatus for steering light from a laser-excited phosphor element. A laser module 110 is configured to generate coherent light. The coherent light is projected from the laser module 110 into an optical fiber 120, which may be located in a protective tube 130. The protective tube 130 may be employed as a mount for a phosphor capsule 140. The optical fiber 120 conveys the coherent light to the phosphor capsule 140, where the laser is then projected into and spread by optical elements (not shown in FIG. 1A) onto a phosphor element 150 located proximate the center axis 160 of a concave mirror 170.

Excitation by the coherent light causes the phosphor element 150 to phosphoresce and produce resulting light. The resulting light produced by the phosphor element 150 is projected upon the mirror 170. The mirror 170 is configured to steer the resulting light to be dispersed in a general direction. In the illustrated embodiment, the mirror 170 is a paraboloid, and the phosphor element 150 is located at least proximate the focus of the mirror 170. For clarity's sake, the focus is not illustrated in FIG. 1A, but is illustrated in FIG. 1B.

The mirror 170 is configured to steer the resulting light toward a particular direction, substantially if not completely collimating it. In FIG. 1A, beams 180a, 180b, 180c represent the resulting light being steered by the mirror 170 in the particular direction and being substantially, if not completely, collimated. "Substantially" is defined for purposes of collimation as being within 5°. Collimated light is useful, for example, for searchlights, theatrical fixtures, spotlights and cinema lighting.

A cover 190 may include further optical elements and/or an exit aperture to shape or mask portions of the resulting light as it departs the apparatus. The optical elements (not shown) may cause relative convergence or divergence of the resulting light. The exit aperture may act as a gobo, giving a spatial shape or pattern to the resulting light.

In an alternative embodiment, the mirror 170 is ellipsoid, and the phosphor element 150 is located at least proximate a focus of the mirror 170. The mirror 170 is configured to steer the resulting light toward a particular point in space and thereby focus the resulting light. Focused light is useful, for example, in imaging systems, such as projectors.

FIG. 1B is a diagram of the phosphor capsule 140. As stated above, a laser module (110 of FIG. 1A) is configured to generate coherent light, which is projected into the optical fiber 120, which may be located in the protective tube 130. In the embodiment of FIG. 1B, the protective tube 130 is employed as a mount for the phosphor capsule 140, mitigating the need for further supports for the phosphor capsule 140.

The optical fiber 120 conveys the coherent light to the phosphor capsule 140. The coherent light exits the optical fiber 120, passing through a first optical element 141, which takes the form of a convex lens. In an alternative embodiment, the first optical element 141 is a holographic diffuser. In one particular embodiment, the holographic diffuser is a holographic beam-shaping diffuser commercially available from Luminit, LLC of Torrance, Calif. The first optical element 141 causes the coherent light to disperse by a dispersion angle that is a function of the convexity of the first optical element 141. In the illustrated embodiment, the dispersion angle is such that the coherent light disperses to shine on most if not all of a second optical element 142, which takes the form of a concave mirrored surface. In one embodiment, the first optical element 141 spreads the coherent light by about 20°.

The second optical element 142 is configured to reflect the coherent light back and cause it to be projected upon the phosphor element 150. The phosphor element 150 reacts to the energy provided it by the coherent light by producing resulting light. In the illustrated embodiment, the phosphor element 150 produces resulting light that includes wavelengths that are different from that of the coherent light. In one embodiment, the phosphor element 150 produces a spectrum of resulting light. In a related embodiment, the phosphor element 150 produces resulting light that is visible to the normal human eye.

In the illustrated embodiment, the phosphor element 150 takes the form of a surface coated with at least one phosphor coating. In the illustrated embodiment, the phosphor coating is such that the phosphor element 150 produces a spectrum of resulting light generally regarded as being white. In the illustrated embodiment, the phosphor coating is located on an inner surface of the phosphor element 150 (an inwardly facing surface of the phosphor element 150 such that interior access to the phosphor capsule 140 must be gained to touch the phosphor coating). In an alternative embodiment, the phosphor coating is also located on an outer surface of the phosphor element 150 (an outwardly facing surface that can be touched without having to gain interior access to the phosphor capsule 140. In another alternative embodiment, the phosphor coating is located on both the inner and outer surfaces.

In the illustrated embodiment, the phosphor coating is composed of a single phosphorescent substance. In alternative embodiments, the phosphor coating is composed of a mixture of multiple phosphorescent substances. Those skilled in the pertinent art are familiar with phosphorescent substances and will understand their application with respect to the phosphor element described herein.

Figure 2:
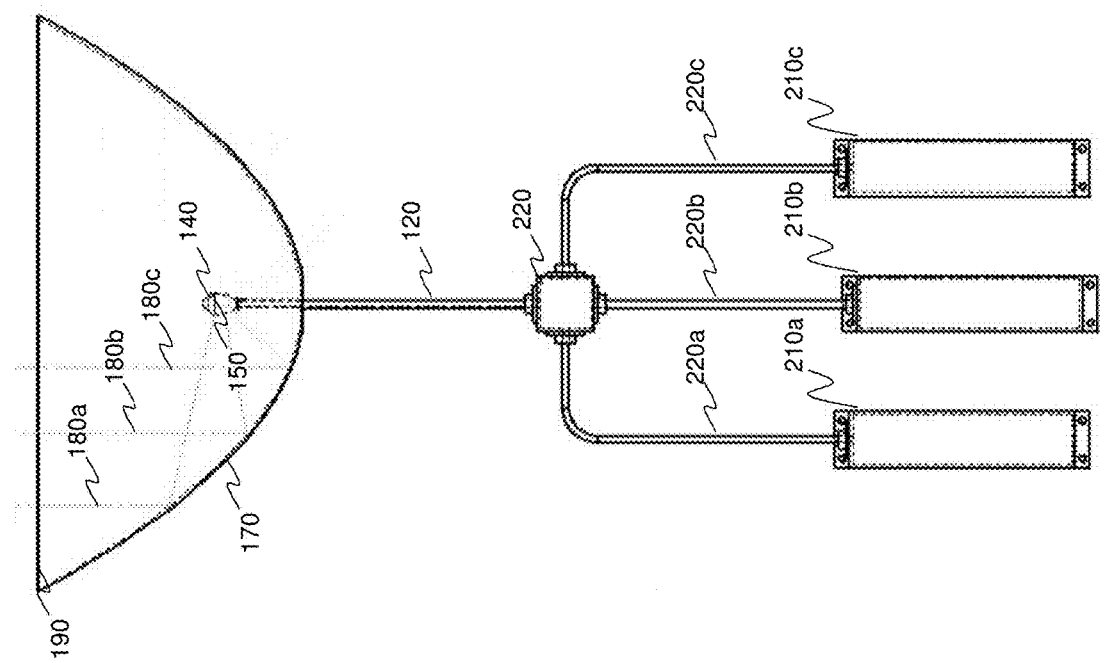
FIG. 2 is a diagram of a second embodiment of an apparatus for steering light from a laser-excited phosphor element.

FIG. 2 is a diagram of a second embodiment of an apparatus for steering light from a laser-excited phosphor element. FIG. 2 includes many elements in common with FIG. 1A. Those elements have the same reference numerals and will not be described in conjunction with FIG. 2. While the embodiment of FIG. 1A employed a single laser module 110, other embodiments of the apparatus employ multiple laser modules. The specific embodiment of FIG. 2 employs three laser modules 210a, 210b, 210c. Optical fibers 220a, 220b, 220c are coupled to respective ones of the laser modules 210a, 210b, 210c as FIG. 2 shows. The optical fibers 220a, 220b, 220c are also coupled to a combiner 220. In one embodiment, the combiner 220 is a dichroic x-cubes. The optical fiber 120, which provides coherent light to the phosphor capsule 140, is also coupled to the combiner 220.

In the embodiment of FIG. 2, the laser modules 210a, 210b, 210c each provide coherent light of different chromaticity (i.e. wavelength). In one embodiment, the different chromaticities are red, green and violet. Accordingly, the laser modules 210a, 210b, 210c provide coherent light to the optical fibers 220a, 220b, 220c and then the combiner 220, which combines the coherent light and provides the combined coherent light to the optical fiber 120. The phosphor element 150 responds to the various chromaticities by producing resulting light as described above. It is assumed that the different chromaticities of the coherent light cooperate to stimulate more phosphorescence or a broader spectrum phosphorescence by the phosphor element 150, and hence a greater or broader-spectrum light output.

In an alternative embodiment, the laser modules 210a, 210b, 210c produce coherent light of substantially the same chromaticity ("substantially" being defined for purposes of chromaticity to be within 1%). This embodiment allows the coherent light produced by separate, smaller laser modules to be combined to equal that of a single, presumably more expensive laser module.

As described above, the phosphor element 150 may include a phosphor coating located on at least one surface of the phosphor element 150. The surface may be an inner surface or an outer surface thereof. The phosphor coating may be an element or composed of multiple elements, which may be jointly or severally selected to be particularly well excited by the coherent light produced by the laser modules 210a, 210b, 210c.

Figure 3:
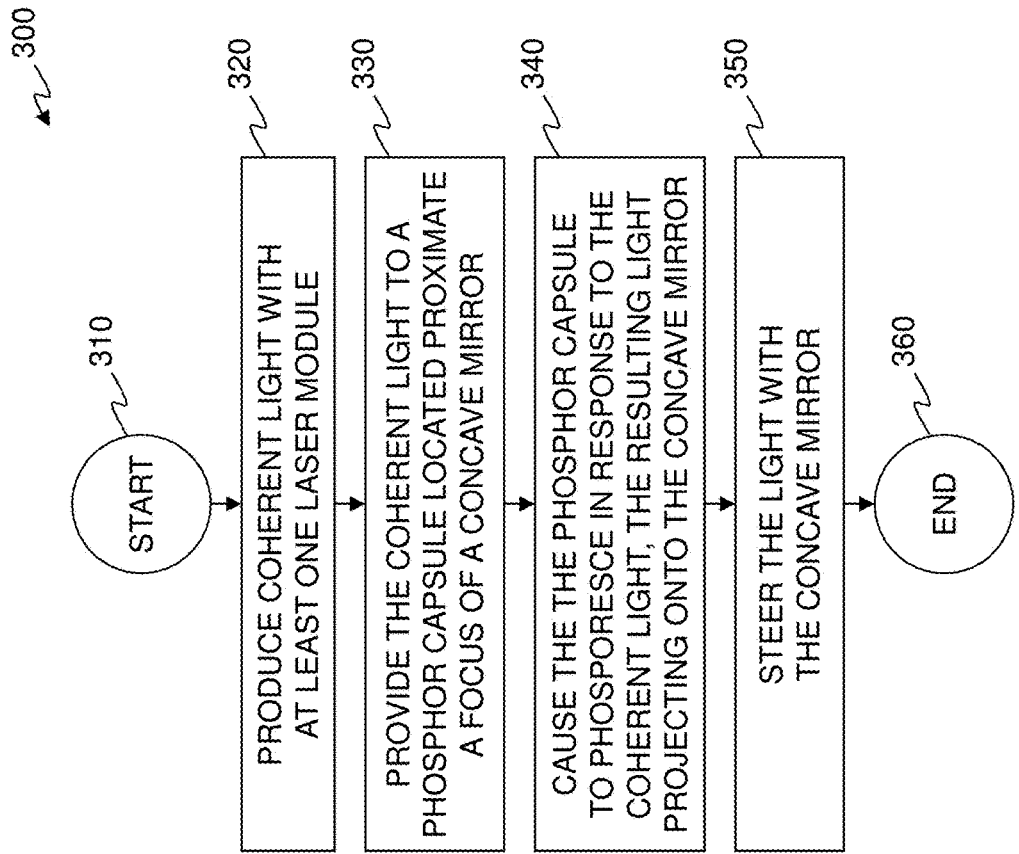
FIG. 3 is a flow diagram of one embodiment of a method of steering light from a laser-excited phosphor element.

FIG. 3 is a flow diagram of one embodiment of a method 300 of steering light from a laser-excited phosphor element. The method 300 begins in a start step 310. In a step 320, at least one laser module produces coherent light. In a step 330, the coherent light is provided to a phosphor capsule located proximate a focus of a concave mirror. In a step 340, the phosphor capsule phosphoresces in response to the coherent light and projects the resulting light onto the concave mirror. The concave mirror steers the resulting light in a general direction in a step 350. The method 300 ends in an end step 360.

Those skilled in the art to which this application relates will appreciate that other and further additions, deletions, substitutions and modifications may be made to the described embodiments.

What is claimed is:

1. A lighting apparatus, comprising:
a laser module configured to generate coherent light;
a concave mirror; and
a phosphor capsule comprising a phosphor material, a first end of said phosphor capsule coupled to said laser module and having an optical element configured to spread said coherent light within said phosphor capsule and toward an internal reflector, and a second end having said internal reflector positioned thereon to reflect light from said laser module into said phosphor capsule, said phosphor capsule located proximate a focus of said concave mirror to receive and phosphoresce in response to said coherent light and project resulting light upon said concave mirror, said concave mirror configured to steer said resulting light in a direction;
wherein said optical element is a convex lens and is configured to spread said coherent light within said phosphor capsule and toward said internal reflector by a dispersion angle that is a function of a convexity of said optical element.

2. The lighting apparatus as described in claim 1 further comprising an optical fiber coupling said laser module and said phosphor capsule.

3. The lighting apparatus as recited in claim 2 wherein said optical fiber passes through said concave mirror.

4. The lighting apparatus as recited in claim 3 further comprising a protective tube surrounding said optical fiber.

5. The lighting apparatus as recited in claim 4 wherein said protective tube is configured to be a mount for said phosphor capsule phosphor material is located on an interior or exterior of said wall.

6. The lighting apparatus as recited in claim 2 further comprising multiple laser modules coupled to a combiner, said combiner coupled to said optical fiber.

7. The lighting apparatus as recited in claim 6 wherein said multiple optical modules are configured to produce coherent light of different chromaticities.

8. The lighting apparatus as recited in claim 1 wherein said
  internal reflector is configured to spread and project said coherent light over said phosphor element.

9. The lighting apparatus as recited in claim 1 wherein said phosphor capsule comprises a phosphor element having a phosphor coating of a phosphorescent substance located on a surface thereof.

10. The lighting apparatus as recited in claim 9 wherein said surface is an inner surface of said phosphor capsule.

11. The lighting apparatus as recited in claim 10 further comprising a different phosphorescent substance located on an outer surface of said phosphor capsule.

12. The lighting apparatus as recited in claim 1 wherein said concave mirror is a paraboloid.

13. The lighting apparatus as recited in claim 1 wherein said concave mirror is an ellipsoid.

14. The lighting apparatus as recited in claim 1 further comprising a cover coupled to said concave mirror.

15. A method of steering light from a laser-excited phosphor element, comprising:
  producing coherent light;
  transmitting said coherent light into an interior of a phosphor capsule located proximate a focus of a concave mirror and toward an internal reflector located within said phosphor capsule, wherein said phosphor capsule comprises an optical element configured to spread said coherent light within said phosphor capsule and toward said internal reflector, wherein said optical element is a holographic diffuser;
  transmitting said coherent light from said internal reflector;
  causing said phosphor capsule to phosphoresce in response to said coherent light and produce resulting light, said resulting light being projected onto said concave mirror; and
  steering said resulting light in a direction using said concave mirror.

16. The method as described in claim 15 wherein said transmitting comprises causing said coherent light to pass through an optical fiber coupling said laser module and said phosphor capsule.

17. The method as recited in claim 16 wherein said optical fiber passes through said concave mirror.

18. The method as recited in claim 16 further comprising multiple laser modules coupled to a combiner, said combiner coupled to said optical fiber.

19. The method as recited in claim 18 wherein said multiple optical modules are configured to produce coherent light of different chromaticities.

20. The method as recited in claim 15 wherein said internal reflector is configured further to spread and project said coherent light over said phosphor element.

21. The method as recited in claim 15 wherein said phosphor capsule comprises a phosphor element having a phosphor coating of a phosphorescent substance located on a surface thereof.

22. The method as recited in claim 21 wherein said surface is an inner surface of said phosphor capsule.

23. The method as recited in claim 22 further comprising a different phosphorescent substance located on an outer surface of said phosphor capsule.

24. The method as recited in claim 15 wherein said concave mirror is a paraboloid.

25. The method as recited in claim 15 wherein said concave mirror is an ellipsoid.

26. The method as recited in claim 15 further comprising a cover coupled to said concave mirror.

* * * * *